Patented June 8, 1937

2,083,311

UNITED STATES PATENT OFFICE 2,083,311

DIAZONIUM SALTS

Gérald Bonhôte and Adolf Wirz, Basel, Switzerland, assignors to Society of Chemical Industry in Basle, Basel, Switzerland No Drawing. Application March 26, 1936, Serial No. 71,045. In Switzerland April 2, 1935

3 Claims. (Cl. 260—69)

This invention relates to an improvement in or a modification of that described in application Serial No. 71,044.

In that application there is described a manufacture of aryl-diazonium salts by precipitating a diazo-compound derived from an ortho-aminodiphenyl-ether with a salt of benzene-mono-sulfonic acid.

The present invention relates to the manufacture of diazonium salts by precipitating a diazo-compound derived from a substituted nitraniline with a salt of benzene-mono-sulfonic acid. The new aryl-diazonium salts thus obtained correspond with the general formula

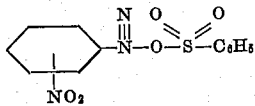

and are characterized by cheapness and very favorable solubility combined with a high degree of stability. The products deriving from ortho-nitranilines are particularly valuable.

The following examples illustrate the invention, the parts being by weight:—

Example 1

52 parts of 4-chloro-2-nitraniline, 90 parts of hydrochloric acid of 30 per cent. strength, 90 parts of finely subdivided ice are stirred well together and into the mixture is run in the course of about 30 minutes a solution of 24 parts of sodium nitrite in 45 parts of water, care being taken that the temperature does not rise above 5° C. After the addition of the sodium nitrite solution, the whole is stirred for some time and then filtered from some impurities. The diazonium salt is now precipitated from the diazo-solution by stirring into the latter 60 parts of sodium benzene-mono-sulfonate. The whole is stirred for some further time while thoroughly cooling and the salt of the formula

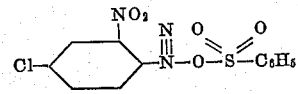

is filtered and dried in a vacuum at 35–40° C. It is easily soluble in water and is mixed with the usual auxiliary materials, for instance aluminium sulfate, chloro-benzene-disulfonic acid, naphthalene-trisulfonic acid, Glauber's salt.

Example 2

Into a suspension of 45.6 parts of 1-amino-4-nitro-2-methylbenzene in 90 parts of hydrochloric acid of 30 per cent. strength and 75 parts of ice there is run, while stirring well and in the course of 30–45 minutes, a solution of 24 parts of sodium nitrite in 45 parts of water. The mixture is stirred for some time and then filtered from some impurities. The diazonium compound is precipitated from the solution by stirring into it 60 parts of finely pulverized sodium benzene-mono-sulfonate. After the addition stirring is continued for 2 to 3 hours while cooling well and the salt of the formula

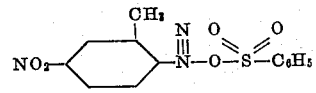

is then filtered. When dried at 35–40° C. in a vacuum the diazonium salt may be mixed with aluminium sulfate and sodium sulfate to produce a product of desired strength.

Example 3

45.6 parts of 1-amino-2-nitro-4-methylbenzene are stirred together with 90 parts of ice and 75 parts of hydrochloric acid of 30 per cent. strength. Into the mixture is run in the course of 30–45 minutes a solution of 24 parts of sodium nitrite in 45 parts of water, care being taken that the temperature of the mixture does not rise above 5° C. After some time the solution is filtered from some impurities and there are stirred into it 60 parts of sodium benzene-mono-sulfonate, stirring being continued for a further 2 to 3 hours while cooling well; filtration follows. The salt of the formula

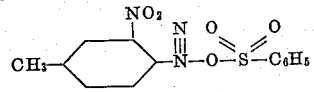

thus obtained is dried in a vacuum at 35–40° C. and adjusted to the desired concentration by mixing it with the usual auxiliary materials, for instance crystallized or partially dehydrated aluminium sulfate, calcined Glauber's salt or the like. The 1-diazo-2-nitro-4-methoxybenzene behaves similarly.

Example 4

46.8 parts of 1-amino-2-methyl-5-nitrobenzene are stirred well with 75 parts of hydrochloric acid of 30 per cent. strength and 75 parts of ice, and there is added to the mixture by drops, in the course of 30 minutes, a solution of 24 parts of sodium nitrite in 45 parts of water, while cooling well, so that the temperature does not rise above 5° C. After the addition of a sodium nitrite solution stirring is continued for some time. Into the filtered diazo-solution there is now introduced gradually 60 parts of finely pulverized sodium benzene-monosulfonate and the mixture is stirred for 2 to 3 hours, while cooling well and afterwards filtered. The diazonium salt of the formula

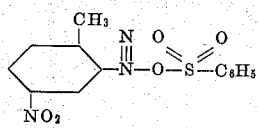

dried in a vacuum at 35–40° C., may be adjusted to the desired concentration by mixing it with aluminium sulfate and sodium sulfate.

What we claim is:—

1. The diazonium salts of the general formula

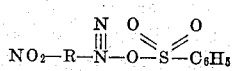

wherein R is a member of the group consisting of the phenylene, alkylphenylene and alkoxyphenylene radicals, which products are light colored powders, dissolving in water and suitable for the manufacture of diazo preparations.

2. As new products, the diazonium salts of the general formula

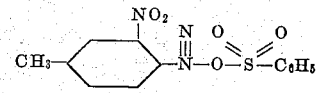

which products are light colored powders, dissolving in water and suitable for the manufacture of diazo preparations.

3. As new products, the diazonium salts of the general formula

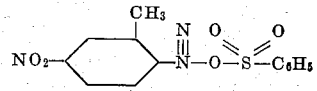

which products are light colored powders, dissolving in water and suitable for the manufacture of diazo preparations.

GÉRALD BONHÔTE.
ADOLF WIRZ.